S. V. Lowe,
Boring Steam-Boiler Flue-Sheets,
Nº 17,288. Patented May. 12, 1857.

Inventor.
S. V. Lowe.

UNITED STATES PATENT OFFICE.

SYLVANUS V. LOWE, OF READING, PENNSYLVANIA.

MACHINE FOR BORING FLUE-SHEETS OF STEAM-BOILERS.

Specification of Letters Patent No. 17,288, dated May 12, 1857.

*To all whom it may concern:*

Be it known that I, SYLVANUS V. LOWE, of the city of Reading, in the county of Berks and State of Pennsylvania, have invented a new and useful Machine for Boring Boiler and Flue Sheets in the Manufacture of Steam-Boilers; and I do hereby declare that the following is a full and exact description of the construction and operation of the same, reference being had to the annexed drawings, making a part of this specification, in which—

Figure 1:
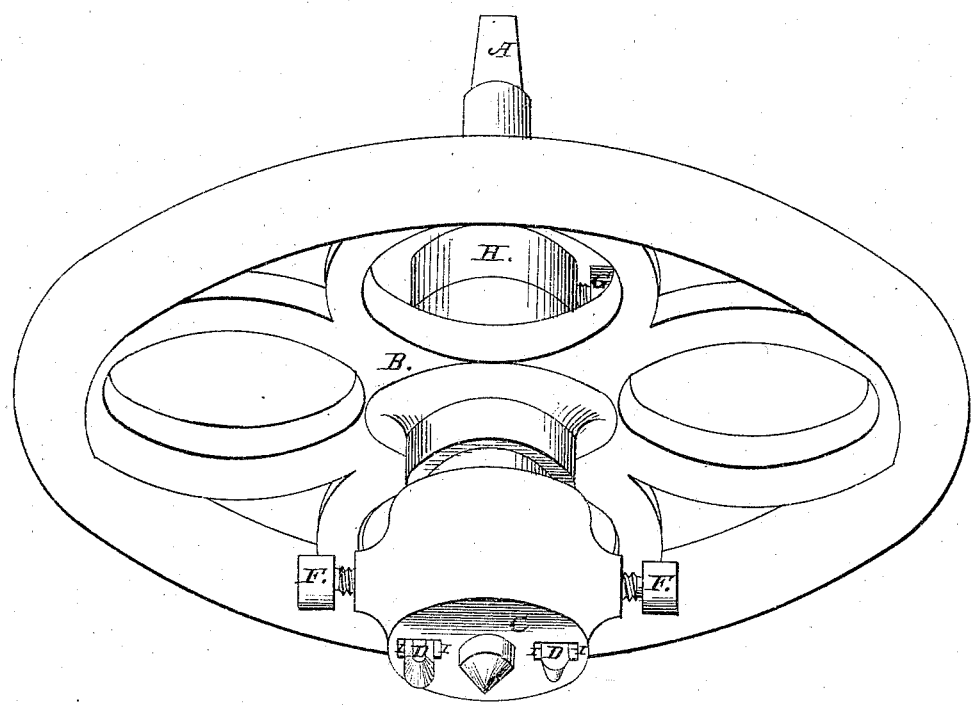
Figure 2:
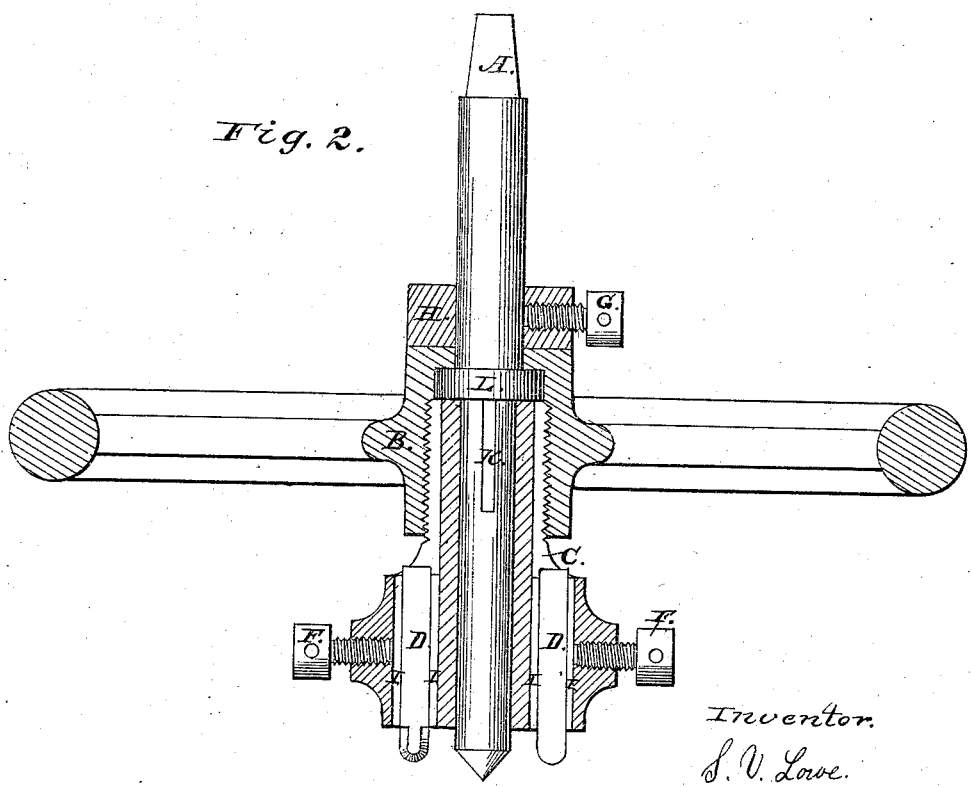

Figure 1 is a perspective view and Fig. 2 is a longitudinal section where A is a cast steel mandrel with feather K inserted therein below collar L in order to impart motion to cutterhead C which is made of cast iron with male screw cut on upper part and mortise holes passing from top to bottom into which cutters D D are inserted.

B is a cast iron hand wheel with a female screw cut partly through the center in order to impart feed motion to cutterhead C.

D D are cast steel cutters inserted into cutterhead C and can be adjusted to cut different sized holes by means of small iron plates I I I I and steel set screws F F.

H is an iron collar which is set fast firmly to mandrel A by means of set screw G which confines hand wheel B to its proper place by means of collar L on mandrel A inside of wheel boss B.

The top or square part of mandrel A is applied to any ordinary drill stock or press to which motion is attached and is screwed down with the point of mandrel A into center mark where a hole is desired to be cut into boiler or flue sheet or any object of a similar purpose. Motion is then imparted to the machine by drill stock press or lathe which causes mandrel A to revolve in center mark of hole and at the same time serves to hold the object to be bored firmly in its place and by holding hand wheel B by the operator at successive intervals causes cutterhead C to descend by means of male and female screws cut into wheel B and head C collar H securing wheel B in its proper rotative place. The cutters D D cut a concentric circle around and through the object to be bored and leave the center of hole remaining solid.

The simplicity and efficiency of this machine in its operation over other machines adapted to this purpose is, that others must first bore guide holes while this machine finishes any size of hole desired in the same time others use to bore guide holes through boiler and flue sheets.

What I claim and desire to secure by Letters Patent is—

The attachment and use of mandrel A when constructed arranged and adapted to this purpose only, and made to operate in a manner as substantially described and set forth.

SYLVANUS V. LOWE.

Witnesses:
MATTHIAS MENGEL,
G. S. KINSEY.